(12) United States Patent
Butovitsch et al.

(10) Patent No.: US 6,259,927 B1
(45) Date of Patent: Jul. 10, 2001

(54) TRANSMIT POWER CONTROL IN A RADIO COMMUNICATION SYSTEM

(75) Inventors: Peter Butovitsch, Bromma; Tomas Sandin, Stockholm; Magnus Persson, Sollentuna, all of (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 08/870,867

(22) Filed: Jun. 6, 1997

(51) Int. Cl.$^7$ ............................................... H04B 7/005
(52) U.S. Cl. ......................... 455/522; 455/67.3; 455/69; 455/642
(58) Field of Search ............................. 455/67.3, 69, 70, 455/436, 450, 453, 522, 524, 442, 67.1

(56) References Cited

U.S. PATENT DOCUMENTS

| | | |
|---|---|---|
| 4,901,307 | 2/1990 | Gihousen et al. . |
| 5,056,109 | 10/1991 | Gilhousen et al. . |
| 5,109,528 | 4/1992 | Uddenfeldt . |
| 5,257,283 | 10/1993 | Gilhousen et al. . |
| 5,265,119 | 11/1993 | Gilhousen et al. . |
| 5,327,577 | 7/1994 | Uddenfeldt . |
| 5,345,598 | 9/1994 | Dent . |
| 5,390,338 | 2/1995 | Bodin . |
| 5,412,686 | 5/1995 | Ling . |
| 5,485,486 | 1/1996 | Gilhousen et al. . |
| 5,487,174 | 1/1996 | Persson . |
| 5,491,837 | 2/1996 | Haartsen . |
| 5,530,917 * | 6/1996 | Andersson et al. .................. 455/450 |
| 5,566,165 | 10/1996 | Sawahashi et al. . |
| 5,603,096 | 2/1997 | Gilhousen et al. . |
| 5,666,356 * | 9/1997 | Fleming et al. ...................... 455/453 |
| 5,713,074 * | 1/1998 | Hulbert ................................. 455/69 |
| 5,771,451 | 6/1998 | Takai et al. . |
| 5,842,114 * | 11/1998 | Ozluturk .............................. 455/69 |
| 6,073,025 * | 6/2000 | Chheda et al. ..................... 455/522 |

FOREIGN PATENT DOCUMENTS

| | | |
|---|---|---|
| 42 25 582 | 2/1994 | (DE) . |
| 0 288 904 | 11/1988 | (EP) . |
| 0 682 418 | 11/1995 | (EP) . |
| 680 160 | 11/1995 | (EP) . |
| 9-074378 | 7/1997 | (JP) . |
| 95/07012 | 3/1995 | (WO) . |
| WO95/12297 | 5/1995 | (WO) . |
| WO96/04718 | 2/1996 | (WO) . |
| 97/08911 | 3/1997 | (WO) . |
| 98/11677 | 3/1998 | (WO) . |

OTHER PUBLICATIONS

TIA/EIA Interim Standard TIA/EIA/IS–95A; Section 6.1.2.3.2 Closed Loop Output Power.
TIA/EIA Interim Standard TIA/EIA/IS–95A; Section 7.1.3.7 Power Control Subchannel.
TIA/EIA Interim Standard TIA/EIA/IS–95A; Section 6.6.4.1.1 Forward Traffic Channel Power.
TIA/EIA Interim Standard TIA/EIA/IS–95A; Section 7.6.4.1.1 Forward Traffic Channel.
TIA/EIA Interim Standard TIA/EIA/IS–95A; Section 6.6.6.2.7.2 Reverse Traffic Channel.

* cited by examiner

*Primary Examiner*—Lester G. Kincaid
(74) *Attorney, Agent, or Firm*—Burns, Doane, Swecker & Mathis, L.L.P.

(57) ABSTRACT

Methods of controlling the power levels of transmitted signals in telecommunication systems are described. For example, a remote terminal measures the quality of a received signal, either by determining the frame error rate or the bit error rate, and reports its quality measurement to a network by sending a quality message. The network causes the signal transmitters to adjust their transmit power levels appropriately. Faster power control methods may be combined with slower power control methods for downlink (network to remote terminal) transmissions in various communications scenarios, such as soft hand-overs.

17 Claims, 4 Drawing Sheets

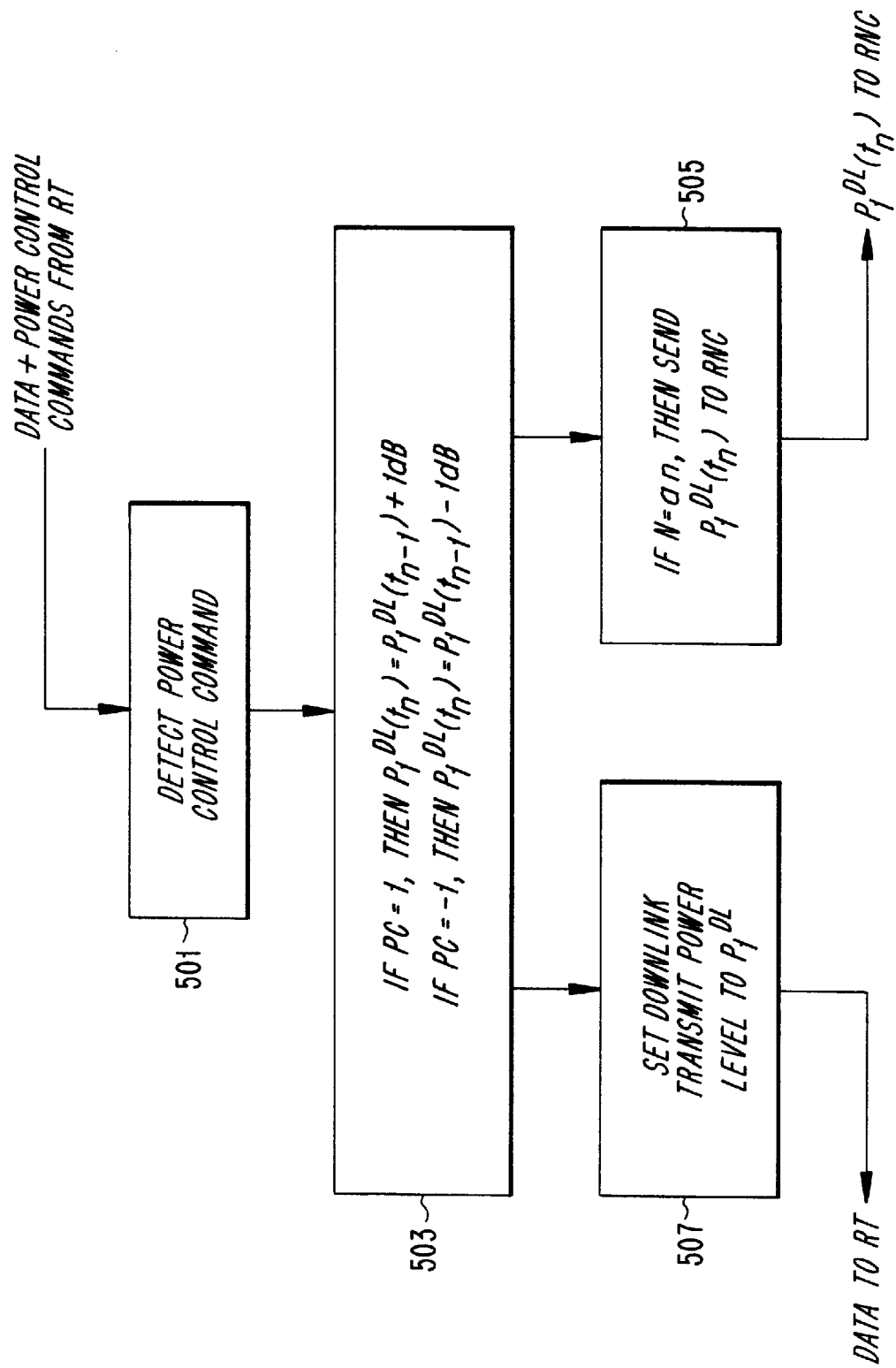

TRANSMIT POWER CONTROL IN A RADIO COMMUNICATION SYSTEM

BACKGROUND

This invention relates to the control of power levels of transmitted signals in telecommunication systems, in particular spread spectrum multiple access systems.

Good transmit power control methods can be important to communication systems having many simultaneous transmitters because such methods reduce the mutual interference of such transmitters. For example, transmit power control is necessary to obtain high system capacity in communication systems that use code division multiple access (CDMA). This is important for the uplink, i.e., for transmissions from a remote terminal to the network, e.g., a base station. Uplinks are also sometimes called reverse links.

In a typical CDMA system, an information data stream to be transmitted is impressed upon a much-higher-bit-rate data stream produced by a pseudorandom code generator. The information signal and the pseudorandom signal are typically combined by multiplication in a process sometimes called coding or spreading the information signal. Each information signal is allocated a unique spreading code. A plurality of coded information signals are transmitted as modulations of radio frequency carrier waves and are jointly received as a composite signal at a receiver. Each of the coded signals overlaps all of the other coded signals, as well as noise-related signals, in both frequency and time. By correlating the composite signal with one of the unique spreading codes, the corresponding information signal can be isolated and decoded.

The need for transmit power control in the uplink is recognized in current CDMA cellular systems, as may be seen from "Mobile Station-Base Station Compatibility Standard for Dual-Mode Wideband Spread Spectrum Cellular System", TIA/EIA Interim Standard TIA/EIA/IS-95 (July 1993) and its revision TIA/EIA Interim Standard TIA/EIA/IS-95-A (May 1995). Such standards that determine the features of U.S. cellular communication systems are promulgated by the Telecommunications Industry Association and the Electronic Industries Association located in Arlington, Va.

Uplink power control according to the IS-95-A standard is provided by a closed-loop method, in which a base station measures the strength of a signal received from a remote station and then transmits one power control bit to the remote station every 1.25 milliseconds. Based on the power control bit, the remote station increases or decreases its transmit (uplink) power by a predetermined amount. According to Sections 6.1.2.3.2 and 7.1.3.1.7 of the standard, a "zero" power control bit causes the remote station to increase its transmit power level by 1 dB and a "one" power control bit causes the remote station to decrease its transmit power level by 1 dB. The IS-95-A standard also addresses uplink power control in other situations, such as when a remote station accesses system (before the closed-loop power control method is active), but these are not pertinent to this application.

The need for transmit power control for the downlink, i.e., for transmissions from the network to a remote station, has been deemed less important in current cellular and other CDMA communication systems. Downlinks are also sometimes called forward links. This may have been due in part to the fact that interference from other transmitters is a smaller problem for the downlink than it is for the uplink because, from a remote terminal's point of view, the interference fades coherently with the downlink signal intended for it. The need for downlink transmit power control may also have been misjudged because signals from a base station are mutually orthogonal in a communication system that complies with the IS-95-A standard, and hence a large part of the mutual interference at a remote terminal is orthogonal to the downlink signal intended for it.

Moreover, the IS-95-A standard specifies a communication system that is intended to handle only speech, resulting in symmetrical load on the uplink and downlink. Since it has usually been assumed that mutual interference in the uplink, not the downlink, limits system capacity, downlink transmit power control has been deemed less important. In future communication systems, services may not be symmetrical in the uplink and downlink, and thus it is important to optimize both links independently of each other.

A trivial form of downlink power control would be provided by a communication system in which a remote terminal measures its received downlink power level and simply reports the measurement to a base station, which might adjust its transmit power in predetermined circumstances. Such a communication system is among those described in International Patent Publication No. WO 95/12297 by Gilhousen et al., which also describes a communication system in which downlink transmit power level is reduced by a predetermined amount based on frame error rate measurements, received uplink power levels, or received downlink power levels.

Downlink power control in a system compliant with the IS-95-A standard is based on frame error rate (FER) measurements by the remote station, which sends FER reports to the system. Sections 6.6.4.1.1 and 7.6.4.1.1 of the IS-95-A standard note that such FER reports can be sent when a threshold has been crossed and/or periodically. (Typically, an FER report would be sent every 1–5 seconds.) One problem with this method is that it can take a long time (several seconds) to accumulate the appropriate FER statistics. As a result, it is impossible to track Rayleigh fading and shadow fading. The method has proved to be so slow that it is usually attributed hardly any gain compared to not using downlink power control.

Some newer personal communications systems (PCS) also use CDMA. The features of U.S. PCS systems are specified in "Personal Station-Base Station Compatibility Requirements for 1.8 to 2.0 GHz Code Division Multiple Access (CDMA) Personal Communications Systems", ANSI J-STD-008 (August 1995), which is similar to the cellular IS-95 standard in many respects. For operation with rate set 2, however, the J-STD-008 standard requires the remote station to report downlink frame errors whenever they occur. This puts the network in complete control of frame errors, but it still takes a long time to accumulate the appropriate statistics, yielding only slight improvement over the IS-95-A standard's method.

In other communication system concepts like CODIT, which is described in "Final Report on Radio Subsystem Functionality", R2020/CSE/LC/DS/P/047/al, UMTS Code Division Testbed (CODIT), CSELT Centro Studi e Laboratori Telecomunicazioni S.p.A. ed. (August 1995), the signal quality is determined by estimating the raw bit error rate (BER) instead of the FER. Hence, good statistics can be obtained faster, and a remote station sends BER reports to the network more often (typically, 1–10 times per second). System performance is considerably improved in comparison to a system using downlink transmit power control according to the IS-95-A standard, but the CODIT method is still too slow to handle Rayleigh fading.

One might use the uplink transmit power control method described in the IS-95-A standard for transmit power control in the downlink. This is described in European Patent Publication No. 0 680 160 by Dohi et al. The remote terminal would then measure the downlink signal to interference ratio (SIR) and transmit an appropriate power control command on the uplink. In accordance with the IS-95-A standard, each power control command would be a single bit that was uncoded in order to minimize signaling overhead. Nevertheless, the communication system to which European No. 0 680 160 is directed has some significant differences from the system specified by the IS-95-A standard. For example, the European system has a frame length that is half that of IS-95-A, a bit rate of several hundred kilobits per second, a wider channel bandwidth of 5 MHz, and a CDMA chip rate of four million chips per second.

Such a communication system would track Rayleigh fading fairly well, and might work well when the remote terminal is not in a soft-handoff mode, i.e., when the remote terminal is not communicating with two or more base stations simultaneously. Soft handoff is described in U.S. Pat. Nos. 5,109,528 to Uddenfeldt and 5,327,577 to Uddenfeldt, both of which are expressly incorporated here by reference. When the remote terminal is not in soft-handoff mode, the error rate of the uncoded power control commands would typically be about one percent, which would not cause any great problems.

Nevertheless, the error rate of the uncoded downlink power control commands can be expected to increase significantly when the remote terminal is in soft-handoff mode. In addition, the errors in the commands received in different base stations involved in the soft handoff will be almost independent. Since 1600 power control commands per second would be sent to two base stations involved in a soft handoff according to the system described by Dohi et al., the commanded transmit power levels of the base stations can be expected to drift with respect to each other to levels that may be suboptimal from a system-capacity point of view. The lost capacity occurs because at least one of the base stations in communication with a remote station in soft-handoff mode will transmit at a power level that is too high.

SUMMARY

These and other problems of previous communication systems are solved by Applicants' invention, which provides in one aspect a method of controlling power levels of signals transmitted by base stations in a communication system having base stations and remote stations. The method includes the step of determining in a remote station whether the remote station is simultaneously receiving a first signal transmitted by a first base station and at least one second signal transmitted by at least one second base station that include substantially identical message information. The first base station transmits to a controller a first report of a power level of the first signal, and the at least one second base station transmits to the controller at least one second report of a power level of the at least one second signal. The controller, based on the first report and the at least one second report, transmits to the first base station a first command for controlling the power level of the first signal and transmits to the at least one second base station at least one second command for controlling the power level of the at least one second signal.

This method may further include the steps of, when the first and at least one second signal do not include substantially identical message information, determining a signal to interference ratio of the received first signal, transmitting from the remote station a report of the determined signal to interference ratio, and substantially simultaneously controlling the power level of the first signal based on the report as received at the first base station.

This method may also further include the steps of, when only one of the first signal and at least one second signal is received at the remote station, determining a signal to interference ratio of the received signal, transmitting from the remote station a report of the determined signal to interference ratio, and substantially simultaneously controlling the power level of the signal based on the report as received at the respective base station.

In these methods, the first and second commands may cause the first and second base stations to adjust the power levels of their transmitted signals such that the power levels have a predetermined relation, such as substantial equality to an arithmetic mean of the power levels of the signals transmitted by the first and second base stations. Also, the reports may be sent periodically or upon the occurrence of a predetermined event.

In another aspect of the invention, a method of controlling power levels of signals transmitted by base stations in a communication system having base stations and remote stations includes the step of determining whether the remote station is simultaneously receiving a first signal transmitted by a first base station and at least one second signal transmitted by at least one second base station that include substantially identical message information. When the first and at least one second signal include substantially identical message information, the remote station determines a quality of at least one of the received first signal and the at least one second signal, and transmits a report of the determined quality. The method further includes the step of substantially simultaneously controlling the power level of the first signal and the power level of the at least one second signal based on the report as received at the first base station and the report as received at the at least one second base station.

In a further aspect, the method may also include, when the first and at least one second signal do not include substantially identical message information, the steps of determining a signal to interference ratio of the received first signal, transmitting from the remote station a report of the determined signal to interference ratio, and substantially simultaneously controlling the power level of the first signal based on the report as received at the first base station.

The method may also include, when only one of the first signal and at least one second signal is received at the remote station, the steps of determining a signal to interference ratio of the received signal, transmitting from the remote station a report of the determined signal to interference ratio, and substantially simultaneously controlling the power level of the signal based on the report as received at the respective base station.

The determined quality may be a frame error rate or a bit error rate, and the reports may be sent periodically or upon the occurrence of a predetermined event.

In another aspect of the invention, a method of controlling power levels of signals transmitted by base stations in a communication system having base stations and remote stations includes the step of determining whether the remote station is simultaneously receiving a first signal transmitted by a first base station and at least one second signal transmitted by at least one second base station that include substantially identical message information. When the first signal and at least one second signal include substantially identical message information, the remote station identifies the signal having a highest power level and transmits a report of the identified base station. The power levels of the first and the at least one second signals are controlled based on the report such that the power level of the at least one second signal is substantially zero when the report indicates the power level of the first signal is higher than the power level of the at least one second signal. The controlling step includes determining a signal to interference ratio of the received first signal, transmitting from the remote station a report of the determined signal to interference ratio, and controlling the power level of the first signal based on the report as received at the first base station.

This method may further include the steps of, when the first and second signal do not include substantially identical message information, determining the signal to interference ratio of the received first signal, transmitting from the remote station the report of the determined signal to interference ratio, and substantially simultaneously controlling the power level of the first signal based on the report as received at the first base station.

This method may also further include the steps of, when only one of the first signal and at least one second signal is received at the remote station, determining a signal to interference ratio of the received signal, transmitting from the remote station a report of the determined signal to interference ratio, and substantially simultaneously controlling the power level of the signal based on the report as received at the respective base station. The reports may be sent periodically or upon the occurrence of a predetermined event.

In another aspect of the invention, a method of controlling power levels of signals transmitted by base stations in a communication system having base stations and remote stations includes the step of determining whether the remote station is simultaneously receiving a first signal transmitted by a first base station and at least one second signal transmitted by at least one second base station that include substantially identical message information. When the first signal and at least one second signal include substantially identical message information, the first base station estimates a signal to interference ratio of the first signal received at the remote station, and the at least one second base station estimates a signal to interference ratio of the at least one second signal received at the remote station. These estimates are transmitted to a controller, which compares the respective reports, transmits to the first base station a first command for controlling the power level of the first signal, and transmits to the at least one second base station at least one second command for controlling the power level of the at least one second signal. The at least one second command causes the at least one second base station to reduce the power level of the at least one second signal to substantially zero when the controller determines that the estimated signal to interference ratio of the first signal is larger than the estimated signal to interference ratio of the at least one second signal.

This method may further include the steps of, when the first signal and at least one second signal do not include substantially identical message information, determining a signal to interference ratio of the received first signal, transmitting from the remote station a report of the determined signal to interference ratio, and substantially simultaneously controlling the power level of the first signal based on the report as received at the first base station.

This method may also further include the steps of, when only one of the first signal and at least one second signal is received at the remote station, determining a signal to interference ratio of the received signal, transmitting from the remote station a report of the determined signal to interference ratio, and substantially simultaneously controlling the power level of the signal based on the report as received at the respective base station. The reports may be sent periodically or upon the occurrence of a predetermined event.

BRIEF DESCRIPTION OF THE DRAWINGS

The features and objects of Applicants' invention will be understood by reading this description in conjunction with the drawings, in which:

FIGS. 5A, 5B, and 5C illustrate communication system operation in accordance with Applicants' invention.

DETAILED DESCRIPTION

While this description is in the context of cellular communications systems involving portable or mobile radio telephones, it will be understood by those skilled in the art that Applicants' invention may be applied to other communications applications. Moreover, while the invention may be used in CDMA communication system, it also may be used in other types of communication systems.

A fast uplink power control method involving transmission of power control commands that consist of single uncoded bits sent every 1.25 millisecond is specified by the IS-95-A standard. This method may be understood by referring to FIG. 1, which is described in more detail below. A remote station RT would measure the SIR of the downlink signal of a base station BS1 with which the station RT is communicating, and the remote station RT would transmit a report of the measured SIR or an uncoded power control command to the base station. Based on such a report or command, the power level (and thus the SIR) of the downlink signal would be appropriately controlled by the base station or by another component of the network, such as a radio network controller RNC.

This method may be used for downlink transmit power control, and the European publication EP 0 680 160 cited above describes the use of this method for downlink control during soft handoff. Although such a simple downlink power control method using uncoded commands can be used when the communication system is not in a soft-handoff mode, this simple fast method does not perform well during soft handoff due to the possibility of reception errors and power level drift in the different base stations participating in the soft handoff.

Independent errors in downlink power control commands transmitted by a remote station and received by different downlink transmitters can be expected to cause the commanded transmit power levels of the downlink transmitters to drift with respect to each other. When the strengths of downlink signals from two or more transmitters received at a remote terminal in soft-handoff mode are roughly equal, the rate of drift can be expected to be moderate. When the received downlink signal strengths are unequal, however, the transmit power levels of the downlink transmitters may quickly drift apart, causing large losses in system capacity. The disadvantages of using the fast power control method for the downlink are overcome by Applicants' invention.

One way to solve the problem of downlink transmit power control in accordance with Applicants' invention is a method that makes frequent adjustments of the downlink power levels transmitted from the base stations involved in a soft handoff. These base stations send the latest values of their downlink transmit power levels to a radio network controller, which compares those values and sends respective adjustment commands $\Delta P_1^{DL}(t_n)$ and $\Delta P_2^{DL}(t_n)$ back to the base stations.

Figure 1:
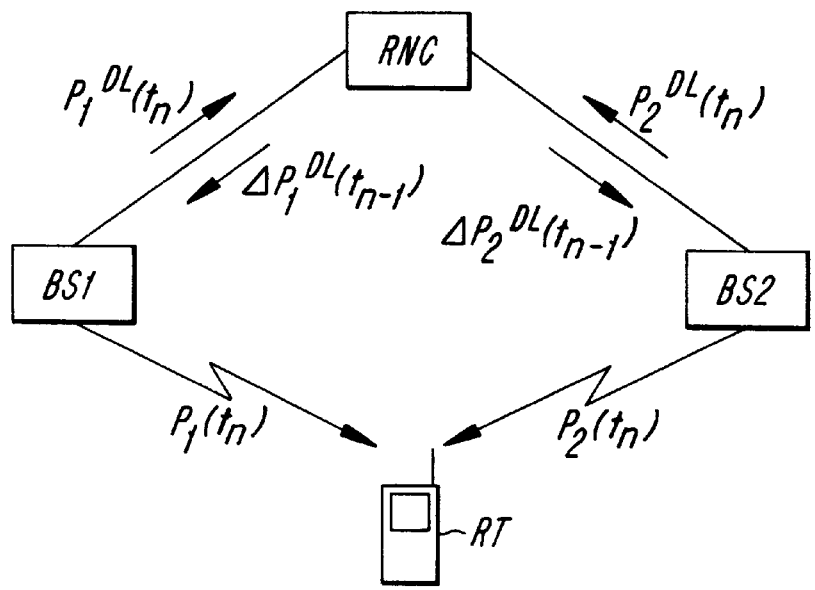
FIG. 1 illustrates a method of downlink transmit power control.

This scenario is illustrated in FIG. 1, in which a base station BS1 sends a message $P_1^{DL}(t_n)$ indicating its downlink transmit power level $P_1(t_n)$ at time $t_n$ to a radio network controller RNC. In a cellular communication system, the controller RNC might be a base station controller or a mobile services switching center. Also, a base station BS2 sends a message $P_2^{DL}(t_n)$ indicating its downlink transmit power level $P_2(t_n)$ at time $t_2$ to the controller RNC. In the soft-handoff mode shown in FIG. 1, a remote station RT receives signals from the base station BS1 and receives signals having substantially the same message information from the base station BS2.

The controller RNC sends respective adjustment commands $\Delta P_1^{DL}(t_n)$ and $\Delta P_2^{DL}(t_n)$ to the base stations that are based on the messages $P_1^{DL}(t_n)$, $P_2^{DL}(t_n)$. In other embodiments described in more detail below, the controller may also determine the adjustment commands based on a report from the remote terminal RT identifying the base station that the remote terminal is receiving at the highest power level or with the best SIR. The adjustment commands cause the base stations to adjust their downlink transmit power levels so that a desired relation between $P_1(t_{n+1})$ and $P_2(t_{n+1})$ is maintained (e.g., both levels may be kept substantially equal or, as described in more detail below, one of the power levels may be controlled to be substantially zero). It will be understood that the transmit power levels $P_1(t_n)$, $P_2(t_n)$ result from earlier commands $\Delta P_1^{DL}(t_{n-1})$ and $\Delta P_2^{DL}(t_{n-1})$, as shown in FIG. 1.

The controller RNC can determine the adjustment commands in several ways. For example, the power levels $P_1(t_n)$ and $P_2(t_n)$ may be adjusted to their arithmetic mean value $(P_1(t_n)+P_2(t_n))/2$. As one alternative, the power levels may be adjusted to their geometric mean value. As another alternative, which has the advantage of fast response, the power levels may be adjusted such that the greater power level is reduced, e.g., to a level substantially equal to the lower power level. As yet another alternative, the power levels may be adjusted such that the lower power level is increased, e.g., to a level substantially equal to the higher power level. As yet another alternative, the power levels may be adjusted such that the lower power level is controlled to be substantially zero. The power level adjustments typically would be made once per frame, keeping the drift between the downlink transmit power levels of the downlink transmitters involved in a soft handoff to a low level, e.g., less than 1 dB on average.

In order to minimize the delays between power level measurement and adjustments, in-band signaling could be used both to send the messages $P_1^{DL}(t_n)$, $P_2^{DL}(t_n)$ from the base stations BS1, BS2 to the controller RNC and to send the adjustment commands $\Delta P_1^{DL}(t_n)$, $\Delta P_2^{DL}(t_n)$ from the controller RNC to the base stations. By "inband signaling" is meant that information is sent together with user data and not as separate messages on a separate control channel.

Figure 2:
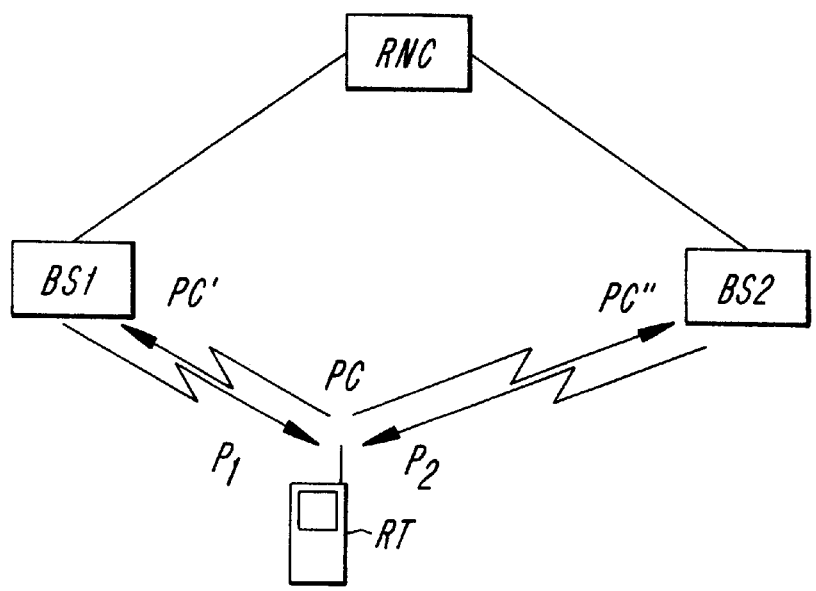
FIG. 2 illustrates a soft handoff involving a remote station and two base stations.

How the independent errors in a remote station's power control commands come about is illustrated in more detail in FIG. 2, which shows a remote terminal RT in communication with two base stations BS1, BS2 that are under the control of a radio network controller RNC. In the soft-handoff mode shown in FIG. 2, as in FIG. 1, the remote station RT receives signals from the base station BS1 with a power level $P_1$, and receives signals having substantially the same message information from the base station BS2 with a power level $P_2$. Power control commands PC transmitted by the remote station RT are received by the base station BS1 as commands PC' and are received by the base station BS2 as commands PC". Due to errors that may arise from many sources, a command PC may not be the same as either or both of the commands PC', PC", and the command PC' may not be the same as the command PC".

The magnitude of the difference between one downlink power level and another downlink power level affects the system's capacity because one base station's transmissions look like interference to the other base station. In addition, the rate that each downlink power level drifts is important because faster rates usually require the control commands to be issued more frequently. This increases the messaging load that must be carried by the links between the base stations BS1, BS2 and the controller RNC.

In a communication system that operates in the manner described in Section 6.6.6.2.7.2 of the IS-95-A standard, the remote terminal's transmit power on the uplink to base stations BS1, BS2 will be regulated mainly as commanded by the "nearer" base station BS1. As a result, the remote station's uplink transmit power level will be too low from the point of view of the "farther" base station BS2. It will be understood that a "nearer" transmitter is not necessarily geographically nearer to a receiver but is nearer from the point of view of received downlink power level, i.e., its downlink signal is received at a higher power level for a given transmitted power level. Similarly, a "farther" transmitter is farther from the point of view of received downlink power level, i.e., its downlink signal is received at a lower power level for the given transmitted power level.

Accordingly, the remote station's power control commands PC will be received with a too low signal level at the base station BS2, causing more power control command errors at the station BS2. These additional errors are differences with the power control commands received at the base station BS1, i.e., PC'≠PC". The difference between $P_1$, and $P_2$ can be large, e.g., as much as 8 dB in some communication systems, and such a large difference results in a probability that PC'≠PC" of about 10%.

Downlink transmit power control in accordance with another aspect of Applicants' invention avoids these problems by using any one of the quality-based downlink power control methods described above, such as the FER-based methods specified in the IS-95-A or J-STD-008 standards or the BER-based method employed in the CODIT system, when the remote terminal is in soft-handoff mode. As described in more detail below, the remote terminal RT measures the quality of the received downlink signal, either by determining the FER or the BER, and then the remote terminal RT reports its quality measurement to the network by sending a suitable quality message to the base stations involved in the handoff. Each base station forwards the remote terminal's quality message (a Layer-3 message) to the controller RNC, which causes the base stations to adjust their downlink transmit powers appropriately.

It is important to understand that the remote terminal's quality messages are more than merely forward link signal strength information, such as that described in the International Publication No. WO 95/12297 cited above. Applicants' quality messages are produced based on downlink signals that have been decoded, or demodulated, rather than on simple signal level or SIR determinations. The additional effort needed to generate the quality messages is rewarded with the advantages of Applicants' invention.

Applicants' method gives close to optimum CDMA communication system capacity for a very low cost in signaling between the network controller RNC and the base stations involved in the soft handoff (e.g., stations BS1, BS2 in FIG. 2). It will be noted that Layer 3 quality messages received by the network controller from a remote terminal through two or more base stations will generally be identical, and thus the controller will not need to negotiate between different quality messages from the same mobile station.

The gain obtained by using the downlink power control method illustrated by FIG. 1 as compared to using one of the quality-based power control methods (FIG. 2) may be small during soft handoff. Since the remote terminal in soft-handoff mode is probably far from the base stations, the remote terminal is likely to have good frequency diversity from each base station due to multipath, and power fluctuations are likely to be slow compared to non-soft-handoff mode. Therefore, remote terminal can use signal energy from all base stations to which it is connected during soft handoff, reducing the effects of fading, and the remote terminal can use "slow" signal-quality-based power control methods since "fast" methods are not needed. It will also be appreciated that the required quality reports can be obtained at a low cost in air interface and transport capacity.

In another aspect of Applicant's invention, the problem of a remote station's power control commands PC being received with a too low signal level at a "farther" base station BS2 during soft-handoff mode is overcome in several ways. A base station that is in "soft-handoff mode" is distinct from a base station that is not in "soft-handoff mode" due to the former's allocation of logical and physical resources, e.g., coder/decoders, to different communication connections.

For example, the remote station RT either may periodically send reports of its received downlink signal strength to the network or may send a report whenever a signal from a new downlink transmitter is received with a strength that is higher than any other currently received downlink signal strength. It will be understood that the IS-95-A standard does not require the remote station to send reports of its received downlink signal strength. In such a communication system, the network controller RNC would respond to the remote station's signal strength reports by causing only the base station whose downlink signal is received with the highest strength at the remote terminal RT to transmit.

Figure 3:
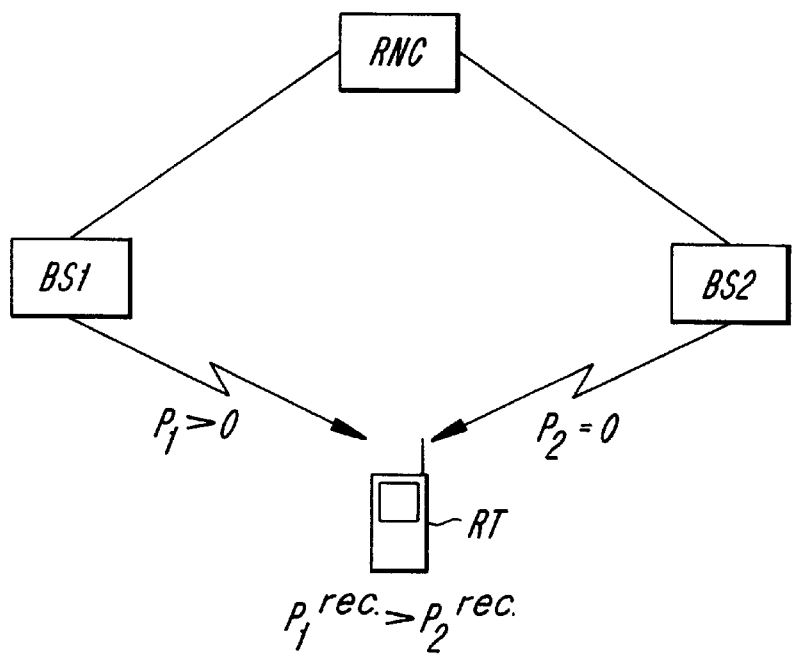
FIG. 3 illustrates one method of overcoming a problem of a remote station's power control commands being received with a signal level that is too low during soft-handoff mode.

This scenario is depicted in FIG. 3, which shows that when the remote terminal's received downlink power level $P_1$ from the base station BS1 is greater than the received downlink power level $P_2$ from the base station BS2, the downlink power level $P_2$. transmitted by the base station BS1 is greater than zero and the downlink power level $P_2$ transmitted by the base station BS2 is zero. (In practice, the power level $P_2$ only needs to be substantially less than the power level $P_1$.) The weaker base station BS2 should operate otherwise normally in soft-handoff mode. The network informs the remote terminal RT whenever the system decides to change the transmitting base station to accommodate base station differences, such as different pseudonoise signals, although different base stations generally look the same from the point of view of the remote station in soft-handoff mode.

The problem of drift between downlink transmit power levels, i.e., that a remote station's power control commands PC are received with a too low signal level at a "farther" base station BS2 during soft-handoff mode, can be overcome in another way in a communication system in which the uplink SIR is measured for each frame in the base stations involved in a soft handoff and the SIR measurements are forwarded to the communication controller. The communication controller processes the SIR values from the base stations involved in the soft handoff and causes only that base station to transmit whose downlink power level received at the remote terminal is highest. It will be understood that signals received from different transmitters, e.g., different base stations, or received from one transmitter, e.g., a mobile station, at different receivers, e.g., different base stations, are advantageously processed by despreading each signal, combining the despread signals, e.g., by using an equalizer, rake receiver, or other equivalent device, and then decoding the combination signal.

Figure 4:
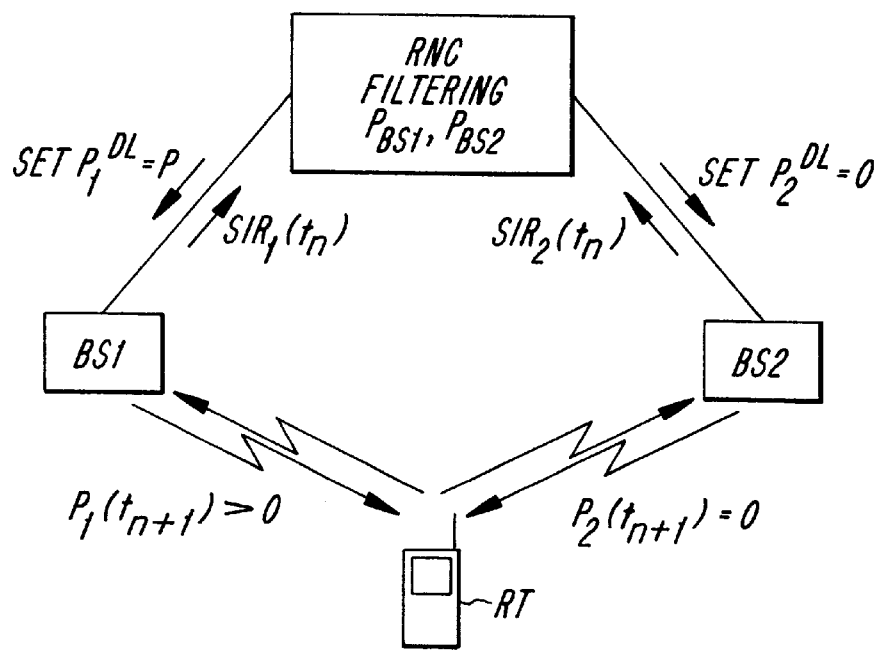
FIG. 4 illustrates another method of overcoming the problem of a remote station's power control commands being received with a signal level that is too low during soft-handoff mode.

This scenario is depicted in FIG. 4, which shows that the downlink power level $P_1(t_{n+1})$ transmitted by the base station BS1 at a time $t_{n+1}$ is greater than zero and the downlink power level $P_2(t_{n+1})$ transmitted by the base station BS2 at the time $t_{n+1}$ is zero. This condition occurs as a result of respective downlink transmit power control set commands $SetP_1^{DL}$, $SetP_2^{DL}$ sent by the radio network controller RNC to the base stations BS1, BS2, respectively. The network controller RNC generates the power set commands based on the base stations' respective determinations and reports of the uplink SIR values $SIR_1(t_n)$, $SIR_2(t_n)$ at the preceding time $t_n$.

Hence, on occasions when the uplink power received at a base station, e.g., station BS1, is higher than the uplink power received at another base station, e.g., station BS2, the controller RNC sends messages to the base station BS1 causing the station BS1 to start transmitting to the remote terminal RT, to the base station BS2 causing the station BS2 to stop transmitting to the remote terminal RT, and to the remote terminal RT causing the terminal RT to listen only to base station BS1 and not to base station BS2 from a specific frame number onwards.

It is currently believed that the method depicted in FIG. 4 works best when the path losses on the uplink and downlink are highly correlated. This is likely to be the case for a communication system like that described in the above-cited European Patent Publication No. 0 680 160 having a downlink/uplink bandwidth of 5 MHz. For such a wide channel bandwidth, multipath propagation to and from the remote station is likely, reducing problems related to Rayleigh fading. Multipath propagation is even more likely in soft-handoff mode, in which the remote terminal is likely to be located at the border between cells or between cell sectors. Thus, the correlation between the channel characteristics of the uplink and downlink will in general be strong. For those cases in which this is not true, the performance of the method depicted in FIG. 4 will to some extent be dependent on the motion of the remote terminal and length of the filter in the network controller.

By applying either method depicted in FIG. 3 and FIG. 4, the remote station receives downlink power only from the base station that is received most strongly. Hence the problem of capacity losses due to downlink transmit power drift is eliminated without significantly increasing the messaging load over the transport interface between the base stations and the network controller. Another advantage of these methods is that the remote terminal remains synchronized to both base stations while the system is in soft-handoff mode; thus, it is unnecessary to expend the time and effort needed to re-synchronize the remote terminal, which would be necessary if the system left soft-handoff mode. A particular advantage of the method depicted in FIG. 4 is that it is independent of how messages in the air interface (the uplink and downlink between the remote terminal and the base stations) are specified; this is not the case for the method depicted in FIG. 3, which involves reports from the remote terminal of its received downlink power level.

Figure 5B:
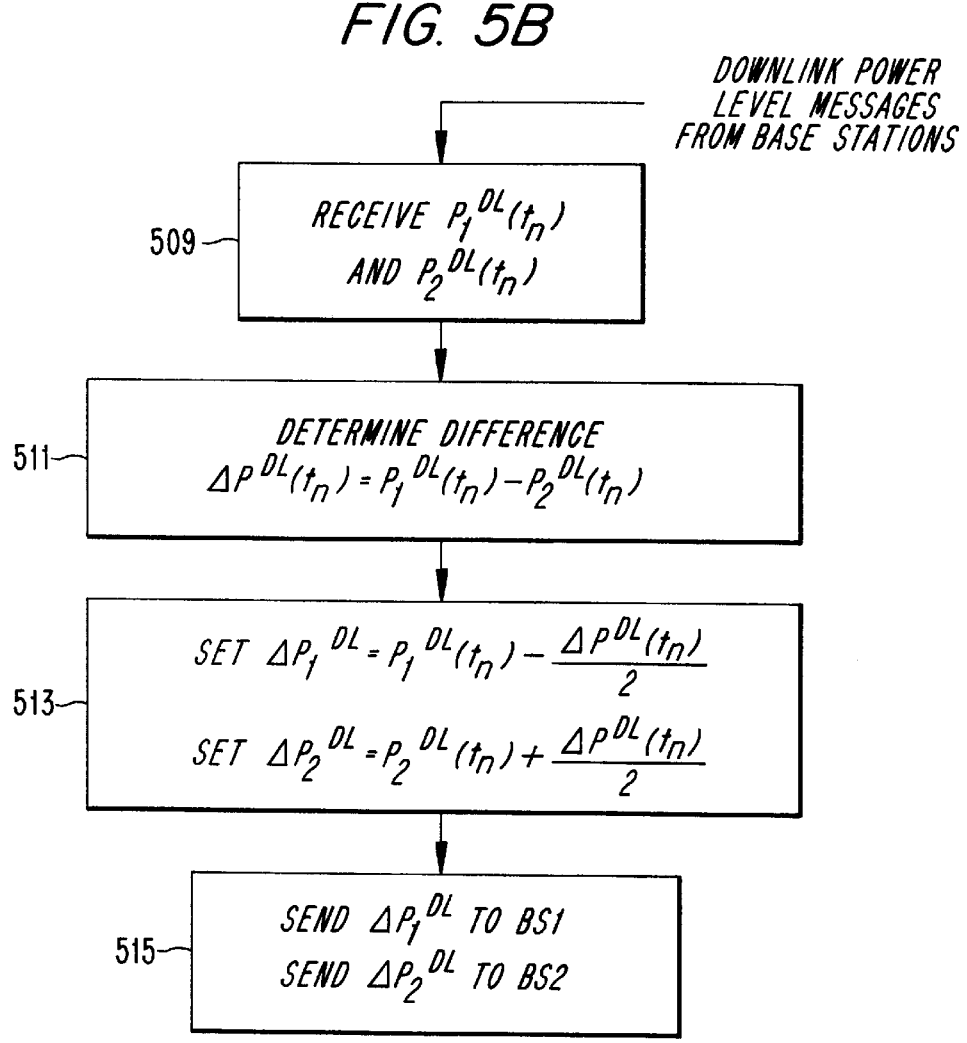
Figure 5C:
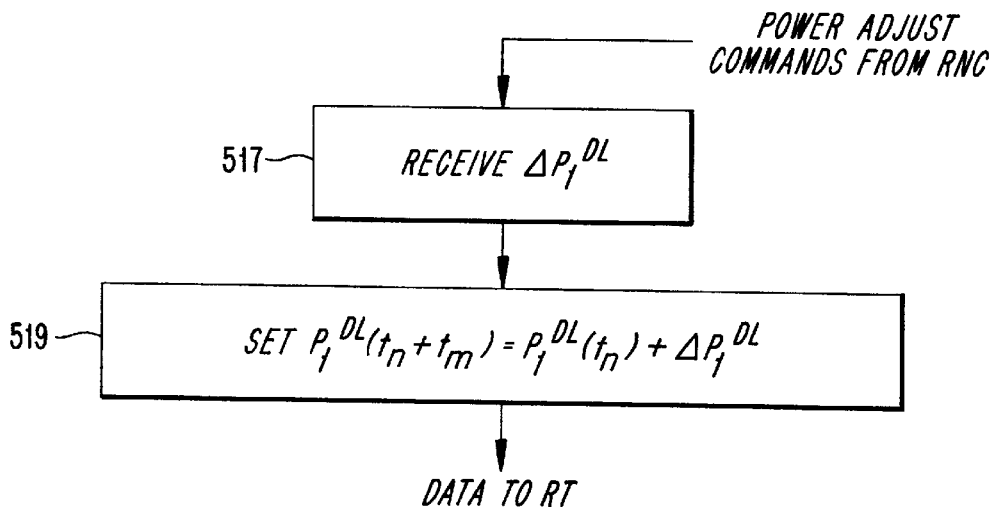

FIGS. 5A, 5B, and 5C further illustrate operation of a communication system in accordance with Applicants' invention. (The method illustrated by these figures is also illustrated in FIG. 1.) In block 501, base station BS1 receives data and transmit power adjustment commands from a mobile station RT. The base station BS1 identifies and decodes an adjustment command received at a first time instant, which conveniently may have values of either +1 or −1, and accordingly adjusts its downlink transmit power level at the next time instant. As indicated by block 503 in FIG. 5A for example, if the mobile sends adjustment command PC=1, then the base station's transmit power level $P_1(t_{n+1})=+1$ dB with respect to its previous transmit power level $P_1(t_n)$. Similarly, if the mobile sends adjustment command PC=1, then the base station's transmit power level $P_1(t_{n+1})=+1$ dB with respect to its previous transmit power level $P_1(t_n)$. In block 505, the message $P_1^{DL}(t_n)$ indicating the downlink transmit power level $P_1(t_n)$ at time $t_n$ is sent by the base station BS1 to the controller RNC. The base station preferably sends such messages not as often as the mobile sends power adjustment commands in order to reduce the signalling load on the base station—controller connection. For example, the base station may count the number of received adjustment commands n and send a message every N-th adjustment command, where N is a factor a times the number n. The factor a may be an integer in the range from about 16 to about 1600 for some communication systems. In block 507, the base station BS1 sets its downlink transmit power level to the commanded amount.

As indicated by block 509 in FIG. 5B, the controller receives the messages $P_1^{DL}(t_n)$ and possibly messages from other base stations involved in a soft handoff, e.g., $P_2^{DL}(t_n)$. The controller, which may include specialized circuitry or a programmable processor for the purpose, then determines new respective adjustment commands $\Delta P_1^{DL}(t_{n+1})$ and $\Delta P_2^{DL}(t_{n+1})$, which as indicated by block 513 in FIG. 5B may be based on the difference (block 511) between the downlink transmit power levels $P_1(t_n)$, $P_2(t_n)$ of the base stations BS1, BS2. In the example illustrated $P_1^{DL}(t_n) > P_2^{DL}(t_n)$, and thus the new adjustment command $\Delta P_1^{DL}(t_{n+1})$ corresponds to the first base station's previous power level less half of the difference between the power levels and the new adjustment command $\Delta P_2^{DL}(t_{n+1})$ corresponds to the second base station's previous power level plus half of the same difference. If $P_2^{DL}(t_n) > P_1^{DL}(t_n)$, substantially the same operations would be carried out but the identities of the base stations would be interchanged. These commands are then communicated in any convenient way to the respective base stations as indicated by block 515.

The operation of this kind of communication system is further illustrated by FIG. 5C, in which an adjustment command $\Delta P_1^{DL}$ from the controller RNC is received by the base station BS1 as indicated by block 517. In response, the base station adjusts its transmit power level at a time $t_n + t_m$ as indicated by block 519, where the interval $t_m$ is a convenient time interval, such as an integer number of communication frames. It will be appreciated that similar operations would be carried out in the other base station (station BS2). In addition, if the power level of the weaker base station were commanded to be substantially zero by the operations indicated by blocks 511–519, the weaker base station might advantageously be maintained in soft-handoff mode in all other respects as described above.

It will be understood that Applicants' invention is not limited to the particular embodiments described above and that modifications may be made by persons skilled in the art. The scope of Applicants' invention is determined by the following claims, and any and all modifications that fall within that scope are intended to be included therein.

What is claimed is:

1. A method of controlling power levels of signals transmitted by base stations in a communication system having base stations and remote stations, comprising the steps of:

determining in a remote station whether the remote station is simultaneously receiving a first signal transmitted by a first base station and at least one second signal transmitted by at least one second base station that include substantially identical message information;

transmitting to a controller from the first base station a first report of a power level of the first signal;

transmitting to the controller from the at least one second base station at least one second report of a power level of the at least one second signal;

comparing in the controller the first report and the at least one second report;

transmitting from the controller to the first base station a first command for controlling the power level of the first signal; and transmitting from the controller to the at least one second base station at least one second command for controlling the power level of the at least one second signal; or when the first and at least one second signal do not include substantially identical message information or when only one of the first signal and at least one second signal is received at the remote station;

determining a signal to interference ratio of the received signal;

transmitting from the remote station a report of the determined signal to interference ratio; and substantially simultaneously controlling the power level of the signal based on the report as received at the first base station.

2. The method of claim 1, wherein the first and second commands cause the first and second base stations to adjust the power levels of their transmitted signals such that the power levels have a predetermined relation.

3. The method of claim 2, wherein the predetermined relation is substantial equality to an arithmetic mean of the power levels of the signals transmitted by the first and second base stations.

4. The method of claim 1, wherein reports are sent periodically.

5. The method of claim 1, wherein a report is sent upon occurrence of a predetermined event.

6. A method of controlling power levels of signals transmitted by base stations in a communication system having base stations and remote stations, comprising in a remote station the steps of:

determining whether the remote station is simultaneously receiving a first signal transmitted by a first base station and at least one second signal transmitted by at least one second base station that include substantially identical message information;

when the first and at least one second signal include substantially identical message information, determining at the remote station a quality of at least one of the received first signal and the at least one second signal;

transmitting from the remote station a report of the determined quality; substantially simultaneously controlling the power level of the first signal and the power level of the at least one second signal based on the report as received at the first base station and the report as received at the at least one second base station;

when the first signal and at least one second signal do not include substantially identical message information, determining a signal to interference ratio of the received first signal; transmitting from the remote station a report of the determined signal to interference ratio; and substantially simultaneously controlling the power level of the first signal based on the report as received at the first base station; and when only one of the first signal and at least one second signal is received at the remote station, determining a signal to interference ratio of the one received signal; transmitting from the remote station a report of the determined signal to interference ratio; and substantially simultaneously controlling the power level of the one received signal based on the report as received at the first base station.

7. The method of claim 6, wherein the determined quality is a frame error rate.

8. The method of claim 6, wherein the determined quality is a bit error rate.

9. The method of claim 6, wherein reports are sent periodically.

10. The method of claim 6, wherein a report is sent upon occurrence of a predetermined event.

11. A method of controlling power levels of signals transmitted by base stations in a communication system having base stations and remote stations comprising the steps of:

determining whether the remote station is simultaneously receiving a first signal transmitted by a first base station and at least one second signal transmitted by at least one second base station that include substantially identical message information;

when the first signal and at least one second signal include substantially identical message information identifying at the remote station the signal having a highest power level;

transmitting from the remote station a report of the identified base station;

controlling a power level of the first signal and a power level of the at least one second signal based on the report such that the power level of the at least one second signal is controlled to be substantially less than the power level of the first signal when the report indicates the power level of the first signal is higher than the power level of the at least one second signal;

when the first signal and at least one second signal do not include substantially identical message information, determining a signal to interference ratio of the received first signal, transmitting from the remote station a report of the determined signal to interference ratio, and substantially simultaneously controlling the power level of the first signal based on the report as received at the first base station; and when only one of the first signal and at least one second signal is received at the remote station determining a signal to interference ratio of the one received signal; transmitting from the remote station a report of the determined signal to interference ratio; and substantially simultaneously controlling the power level of the one received signal based on the report as received at the first base station;

wherein the controlling step includes determining a signal to interference ratio of the received first signal, transmitting from the remote station a report of the determined signal to interference ratio, and controlling the power level of the first signal based on the report as received at the first base station.

12. The method of claim 11, wherein reports are sent periodically.

13. The method of claim 11, wherein a report is sent upon occurrence of a predetermined event.

14. The method of claim 11, wherein the power level of the at least one second signal is controlled to be substantially zero.

15. A method of controlling power levels of signals transmitted by base stations in a communication system having base stations and remote stations, comprising the steps of:

determining whether the remote station is simultaneously receiving a first signal transmitted by a first base station and at least one second signal transmitted by at least one second base station that include substantially identical message information;

when the first signal and at least one second signal include substantially identical message information, estimating at the first base station a signal to interference ratio of the first signal received at the remote station;

estimating at the at least one second base station a signal to interference ratio of the at least one second signal received at the remote station;

transmitting to a controller from the first base station and from the at least one second base station respective reports of the estimated signal to interference ratios;

comparing in the controller the respective reports;

transmitting from the controller to the first base station a first command for controlling the power level of the first signals;

transmitting from the controller to the at least one second base station at least one second command for controlling the power level of the at least one second signal;

when the first signal and at least one second signal do not include substantially identical message information, determining a signal to interference ratio of the received first signal, transmitting from the remote station a report of the determined signal to interference ratio, and substantially simultaneously controlling the power level of the first signal based on the report as received at the first base station; and when only one of the first signal and at least one second signal is received at the remote station, determining a signal to interference ratio of the one received signal; transmitting from the remote station a report of the determined signal to interference ratio; and substantially simultaneously controlling the power level of the one received signal based on the report as received at the first base station;

wherein the at least one second command causes the at least one second base station to reduce the power level of the at least one second signal to substantially zero when the controller determines that the estimated signal to interference ratio of the first signal is larger than the estimated signal to interference ratio of the at least one second signal.

16. The method of claim 15, wherein reports are sent periodically.

17. The method of claim 15, wherein a report is sent upon occurrence of a predetermined event.

* * * * *